United States Patent [19]

Laing

[11] Patent Number: 5,166,622

[45] Date of Patent: Nov. 24, 1992

[54] METHOD OF LOCATING FRESH WATER SPRINGS IN THE OCEANS AND SUPPLYING THE FRESH WATER TO LAND FOR USE

[76] Inventor: Robert L. Laing, 4328 Courtland Rd., Minnetonka, Minn. 55345

[21] Appl. No.: 702,516

[22] Filed: May 20, 1991

[51] Int. Cl.$^5$ .............................. G01V 3/00
[52] U.S. Cl. ................................ 324/323; 324/693
[58] Field of Search ........................ 324/323, 693

[56] References Cited

U.S. PATENT DOCUMENTS 2,973,477  2/1961  Lerner ............................ 324/693

Primary Examiner—Walter E. Snow
Attorney, Agent, or Firm—Richard E. Brink

[57] ABSTRACT

Fresh water springs in the ocean floor are located by moving an electrical conductivity probe along the floor until a minimum conductivity value is measured. Water from the spring may then be piped to an adjacent land mass in need of water.

2 Claims, No Drawings

METHOD OF LOCATING FRESH WATER SPRINGS IN THE OCEANS AND SUPPLYING THE FRESH WATER TO LAND FOR USE

BACKGROUND OF THE INVENTION

This invention relates to a method of locating supplies of fresh water. The invention also relates to a method of delivering such water to locations where it is needed or desired.

In recent years it has become apparent that one of earth's most valuable natural resources, fresh water, is in continually lessening supply. Not only is there increasing competition for the available ground water, but many states are engaged in bitter conflict to determine who is entitled to the water carried by rivers or contained in lakes. Many attempts have been made to secure additional water, including the construction of desalination plants and even towing icebergs from Antarctica to the Northern Hemisphere and permitting them to melt. Despite these heroic efforts, there continues to be an insufficient amount of fresh water to meet the demands for drinking water, irrigation, industrial cooling, etc. The present invention is directed to providing an untapped but substantial source of water for these purposes.

It has long been known that fresh water springs exist in the ocean floor; see, e.g., Job 38:16, and many swimmers have independent knowledge of that fact. Nevertheless, no one has heretofore recognized the potential value of these resources. Nor, it is believed, has anyone heretofore found a way to locate the source of the fresh water emanating from these spring. The present invention not only provides a method of locating fresh water springs in the ocean floor but also provides a method of using the fresh water for the many needs of the world.

DESCRIPTION OF THE INVENTION

The present invention is based on the fact that the conductivity of sea water differs markedly from that of fresh water, the former having an electrical conductivity on the order of 40,000-80,000 micromhos/cm$^2$ and the latter, 20-200 micromhos/cm$^2$.

In accordance with the invention, then, a ship positions itself offshore of a land mass in need of water and moves slowly along a path generally parallel to the coast line, while pulling a conductivity probe along the ocean floor. When the conductivity sharply decreases, it provides evidence that the probe has intersected a river of fresh water. To locate the spring that is the source of the water, the ship then moves slowly in each of the compass directions, carefully monitoring the conductivity reading of the water so as to obtain gradually decreasing values. When the minimum reading is obtained, it may reasonably be assumed that the spring itself has been located.

To render the water from the spring available on land, pipes may then be laid from the spring along the ocean floor to the desired location on shore. Alternatively, of course, the water may be pumped from the spring to holding tanks on the ship.

What is claimed is as follows:

1. A method of locating fresh water springs in the ocean floor comprising the steps of moving a conductivity probe along the ocean bottom until the conductivity of the water decreases significantly, indicating that a fresh water stream has been contacted, and then moving the probe along the stream until a minimum conductivity value is measured, indicating that the spring has been located.

2. The method of claim 1 comprising the additional step of piping fresh water from a spring so located to a land mass.

* * * * *